Patented Jan. 10, 1939

2,143,161

UNITED STATES PATENT OFFICE 2,143,161

VULCANIZATION OF RUBBER

William E. Messer, Cheshire, Conn., assignor, by mesne assignments, to United States Rubber Company, New York, N. Y., a corporation of New Jersey No Drawing. Application March 5, 1935, Serial No. 9,385

10 Claims. (Cl. 18—53)

This invention relates to new accelerators of the vulcanization of rubber and similar vulcanizable materials, and more particularly to manners of using the same.

Broadly the invention comprises incorporating in rubber prior to actual vulcanization, an arylene thiazyl sulphide derivative of a product resulting from reacting hexamethylenetetramine with a mineral acid salt of a saturated or unsaturated hydrocarbon residue of the open chain series.

More specifically the invention relates to the accelerators produced by reacting hexamethylenetetramine with a halide of an aliphatic hydrocarbon, e. g., an alkyl, alkylene or alkylidene group, and then treating the resulting reaction product with a mercapto-aryl thiazole, preferably in the form of a salt thereof such as an alkali salt of a mercapto-aryl-thiazole.

*Example 1.*—Preparation of hexamethylenetetramine-ethyl chloride reaction product:

450 parts of hexamethylenetetramine are placed in an autoclave having steam and water connections for heating and cooling purposes, and the hexamethylenetetramine heated to about 140° C. 202 parts of ethyl chloride are gradually added thereto. The rise in pressure is controlled by cooling water circulation. The internal pressure rises to about 200 pounds per sq. inch and falls off to about 100 pounds in an hour. Steam at 90 pounds per sq. inch pressure is then introduced into the autoclave heating coils and the mix is heated so as to bring the internal pressure up to about 150-225 lbs. per sq. inch. The autoclave is then cooled. The reaction product may be treated in the impure form with a thiazole salt or it may be further purified before reacting with the mercapto-arylthiazole. If the reaction product is treated with, for example, 455 parts of caustic soda (50% solution) the free base is liberated. The free base is an oil and analyzes about 16.9% nitrogen.

A likely explanation of the reaction with hexamethylene-tetramine is that the aliphatic halide adds to the hexamethylenetetramine, which addition product under reacting conditions breaks down to form formaldehyde and an acid salt or addition product of an aliphatic amine, e. g., ethylamine hydrochloride, which materials react to form the acid addition product, e. g., the hydrochloride of the free base. This view is supported by the fact that the product of reaction of ethylamine hydrochloride (1 mole) and formaldehyde (1 mole) has properties apparently like those of the said acid addition product of the free base.

Hence it is to be understood that it is within the scope of the present invention to use the mercapto-aryl thiazole derivatives of the acid addition products produced by reacting equi-molecular proportions of formaldehyde and an aliphatic amine hydrochloride such as the hydrochloride of ethylamine or other mineral acid salt of the amine such as the sulfate, hydrobromide, phosphate, etc. Oxidizing acids such as nitric are excluded. Instead of using a primary aliphatic amine such as ethylamine there may be used the amines of other hydrocarbons disclosed herein.

The amine salt (50% solution in water) may be refluxed with formalin for about four hours, the resulting acid addition product cooled and treated with sodium mercapto benzo thiazole solution, or the acid addition product may be neutralized with alkali and the free base reacted with mercapto-benzothiazole.

Instead of ethyl chloride there may be used for reaction with hexamethylenetetramine, ethyl iodide or bromide, methyl chloride, iodide or bromide, isopropyl chloride, bromide or iodide, tertiary butyl chloride, iodide or bromide, tertiary amyl chloride, iodide or bromide, ethylene chloride, ethylene bromide or iodide, ethylidene chloride, bromide or iodide, alpha chlor ethyl benzene, etc. or mixtures of any of these salts.

The aliphatic halide may be reacted with hexamethylenetetramine per se or its aqueous solution. The temperatures of reaction may range from about 100° C. to about 170° C., and the amounts of halide per mole of hexamethylenetetramine may vary from 1 to 4 moles. Reflux conditions without pressure may be used, but the results are not as good as where pressure or autoclavic treatment is resorted to.

The production and use of the accelerator is illustrated below.

*Example 2.*—10 parts of the free base (16.9% N) of Example 1, is taken up in 40 parts of hydrochloric acid (sp. g. 1.19) and 50 parts of water, and mixed with a solution of 7 parts of mercaptobenzothiazole dissolved in 32 parts of caustic soda (50% solution) and 50 parts of water. Instead of sodium hydroxide, other alkali may be used to dissolve the mercaptobenzothiazole and form an alkali salt thereof. On mixing, a reaction takes place with evolution of heat and separation of a viscous brown resin which may be washed with water to further purify it.

*Example 3.*—A cold solution of about 16.7 parts of mercaptobenzothiazole, 10 parts of sodium hydroxide (50% solution) and 50 parts of water are added to 30 parts of the hydrochloride of the free base (16.5% chlorine) of Example 1, with cooling. An oil separates out at the bottom and may be washed with water to further purify it, if desired. If the oil is dried at 100° C., it forms a solid which can be ground and used as such.

Example 4.—Approximately 58 parts of hexamethylenetetramine ethylene dichloride reaction product (acid addition product) are treated with approximately 33 parts of sodium mercaptobenzothiazole in aqueous solution. The reaction product is a resinous product and may be purified further, if desired, by washing with water.

Instead of reacting the thiazole with the hexamethylenetetramine-halide product, or with the formaldehyde-aliphatic amine salt, in water solution, an alcoholic or other suitable solution may be used. Also the chemicals may be reacted as such, for example the free base may be directly reacted with mercaptobenzothiazole, and the reaction product dried to a hard resinous product which may be pulverized if desired.

Instead of mercaptobenzothiazole, other aryl thiazoles may be used, e. g., those of tolyl, xylyl, etc. as well as substitution products such as the alkyl, chlor, nitro substitution products of mercapto-aryl-thiazole, e. g., 5-nitro mercaptobenzothiazole, 5-chlor mercaptobenzothiazole, 3,5-dimethyl mercaptobenzothiazole, etc. The proportion of thiazole to free base or acid addition product may be varied, as indicated by the above examples, without departing from the invention.

Other salts of the mercapto-aryl-thiazole may be used such as those of potassium, ammonium, calcium, magnesium, zinc, etc. as well as the nitrogen base salts of the mercapto-aryl-thiazole, such as those of ethylamine, methylamine, etc.

Example 5.—In the following tests, the accelerator of Example 2, was compounded in the proportion of 1 part and 1.25 parts, respectively, by weight based on the rubber, in a rubber stock comprising by weight 100 parts smoked sheet, 6 parts zinc oxide, blanc fixe 40 parts, sulfur 2.25 parts, acetone-diphenylamine (antioxidant) 3 parts. The cures are indicated in minutes and pounds/sq. inch steam pressure. T is tensiles/sq. in. and E is percent elongation at break.

TABLE I
Unaged stock

| Cure | Stock with 1 part accelerator | | Stock with 1.25 parts accelerator | |
|---|---|---|---|---|
| | T | E | T | E |
| 3'/60# | 2820 | 816 | 2760 | 800 |
| 4'/60# | 3420 | 796 | 3560 | 803 |
| 5'/60# | 3540 | 783 | 3700 | 796 |
| 6'/60# | 4060 | 820 | 4320 | 820 |
| 8'/60# | 4160 | 816 | 4390 | 816 |
| 10'/60# | 4380 | 826 | 4410 | 790 |

After ageing 8 hours in an air bomb

| Cure | Stock with 1 part accelerator | | Stock with 1.25 parts accelerator | |
|---|---|---|---|---|
| | T | E | T | E |
| 3'/60# | 2230 | 920 | 2440 | 916 |
| 4'/60# | 2450 | 870 | 2370 | 783 |
| 5'/60# | 1420 | 740 | 2480 | 900 |
| 6'/60# | 1860 | 890 | 1830 | 850 |
| 8'/60# | 1480 | 856 | 1930 | 880 |
| 10'/60# | 1350 | 830 | 1750 | 900 |

Example 6.—In the following tests the accelerator of Example 3 was compounded in the proportion of 1 part by weight based on the rubber, in a rubber tread stock comprising by weight 100 parts smoked sheet, 5 parts zinc oxide, carbon black 50 parts, stearic acid 2 parts, pine tar 1 part, sulfur 3 parts, acetone-diphenylamine 1 part. The cures were carried out at 274° F. for the various intervals indicated in minutes.

TABLE II
Unaged

| Cure | T | E |
|---|---|---|
| 15 minutes | 2860 | 623 |
| 30 minutes | 3900 | 646 |
| 45 minutes | 4190 | 603 |
| 60 minutes | 3960 | 603 |
| 90 minutes | 3880 | 556 |
| 120 minutes | 3700 | 543 |
| 180 minutes | 3590 | 546 |

After ageing 48 hours in oxygen bomb (300 lbs. oxygen maintained 70° C.)

| Cure | T | E |
|---|---|---|
| 15 minutes | 2440 | 610 |
| 30 minutes | 2940 | 596 |
| 45 minutes | 3000 | 540 |
| 60 minutes | 2940 | 536 |
| 90 minutes | 2560 | 466 |
| 120 minutes | 2300 | 446 |
| 180 minutes | 2060 | 403 |

The term "rubber" is employed in a generic sense to include caoutchouc, whether natural or synthetic, balata, gutta percha, rubber isomers, and like products whether or not admixed with fillers, pigments, antioxidants, etc.

The invention is to be understood as not limited to the exact procedure followed or proportions employed in the foregoing examples, which are illustrative only and not limiting of my invention. Morever, the invention is to be considered as not limited by any theories advanced in explanation of the chemical changes involved in the manufacture of the compounds set forth but is limited solely by the claims attached hereto.

Having thus described my invention, what I claim and desire to protect by Letters Patent is:

1. A process of producing a vulcanized rubber product which comprises incorporating in rubber prior to actual vulcanization a reaction product resulting from reacting a mercapto-aryl thiazole with a reaction product produced from reacting above the temperature of addition one molecular equivalent of hexamethylenetetramine with one to four molecular equivalents of a chloride of an aliphatic hydrocarbon.

2. A process of producing a vulcanized rubber product which comprises incorporating in rubber prior to actual vulcanization a mercaptobenzothiazole derivative of the free base reaction product produced from reacting one molecular equivalent of hexamethylenetetramine with one to four molecular equivalents of ethylchloride.

3. A process of producing a vulcanized rubber product which comprises incorporating in rubber prior to actual vulcanization a reaction product resulting from reacting an alkali salt of mercapto-aryl-thiazole with a reaction product produced from reacting above the temperature of addition one molecular equivalent of hexamethylenetetramine with one to four molecular equivalents of a chloride of an open chain aliphatic hydrocarbon.

4. A process of producing a vulcanized rubber product which comprises incorporating in rubber prior to actual vulcanization a reaction product resulting from reacting an alkali-metal salt of a mercaptobenzothiazole with a reaction product produced from reacting above the temperature of addition one molecular equivalent of hexamethylenetetramine with one to four molecular equivalents of an alkyl chloride.

5. A process of producing a vulcanized rubber product which comprises incorporating in rubber prior to actual vulcanization a reaction product resulting from reacting an alkali-metal salt of a mercaptobenzothiazole with a reaction product produced from reacting one molecular equivalent of hexamethylenetetramine with one to four molecular equivalents of an alkylene chloride.

6. A process of producing a vulcanized rubber product which comprises incorporating in rubber prior to actual vulcanization a reaction product resulting from reacting an alkali-metal salt of a mercaptobenzothiazole with a reaction product produced from reacting one molecular equivalent of hexamethylenetetramine with one to four molecular equivalents of an ethylene dichloride.

7. A process of producing a vulcanized rubber product which comprises incorporating in rubber prior to actual vulcanization a reaction product resulting from reacting a sodium salt of mercapto-aryl-thiazole with a reaction product produced by reacting one molecular equivalent of hexamethylenetetramine with one to four molecular equivalents of ethyl chloride.

8. A process of producing a vulcanized rubber product which comprises incorporating in rubber prior to actual vulcanization an arylene thiazyl sulphide derivative of a reaction product resulting from reacting above the temperature of addition one molecular equivalent of hexamethylenetetramine with one to four molecular equivalents of a hydrocarbon halide embodying at least two open chain aliphatic carbon atoms at least one of which carbon atoms is attached to halogen.

9. A vulcanization accelerator composition comprising an arylene thiazyl sulphide derivative of a reaction product resulting from reacting above the temperature of addition one molecular equivalent of hexamethylenetetramine with one to four molecular equivalents of a hydrocarbon halide embodying at least two open chain aliphatic carbon atoms at least one of which carbon atoms is attached to halogen.

10. A vulcanization accelerator composition comprising an arylene thiazyl sulphide derivative of a reaction product produced from reacting above the temperature of addition one molecular equivalent of hexamethylenetetramine with one to four molecular equivalents of an alkyl chloride.

WILLIAM E. MESSER.